United States Patent
Suzuki et al.

(10) Patent No.: US 8,938,742 B2
(45) Date of Patent: Jan. 20, 2015

(54) PROCESSING SYSTEM FOR SWITCHING BETWEEN EXECUTION OF A NORMAL TASK AND A MANAGEMENT TASK

(75) Inventors: Hitoshi Suzuki, Kanagawa (JP); Yukihiko Akaike, Kanagawa (JP)

(73) Assignee: Renesa Electronics Corporation, Kawasaki-shi (JP)

( * ) Notice: Subject to any disclaimer, the term of this patent is extended or adjusted under 35 U.S.C. 154(b) by 1564 days.

(21) Appl. No.: 12/292,208

(22) Filed: Nov. 13, 2008

(65) Prior Publication Data

US 2009/0150901 A1 Jun. 11, 2009

(30) Foreign Application Priority Data

Dec. 5, 2007 (JP) .................................. 2007-314352

(51) Int. Cl.
G06F 9/455 (2006.01)
G06F 9/46 (2006.01)
G06F 9/48 (2006.01)

(52) U.S. Cl.
CPC .................................. *G06F 9/4825* (2013.01)
USPC ....................................................... 718/107

(58) Field of Classification Search
None
See application file for complete search history.

(56) References Cited

U.S. PATENT DOCUMENTS

| 6,754,690 | B2 * | 6/2004 | Larson .......................... 718/102 |
| 7,996,658 | B2 | 8/2011 | Nagao et al. |
| 2004/0039935 | A1 | 2/2004 | Pisecky |
| 2006/0206887 | A1 * | 9/2006 | Dodge et al. .................. 717/161 |

FOREIGN PATENT DOCUMENTS

| JP | 2-271437 | 11/1990 |
| JP | 6-290079 | 10/1994 |
| JP | 10-247146 | 9/1998 |
| JP | 2000-322277 | 11/2000 |
| JP | 2004-504667 | 2/2004 |
| JP | 2007-304765 A | 11/2007 |

* cited by examiner

*Primary Examiner* — Corey S Faherty
(74) *Attorney, Agent, or Firm* — McGinn IP Law Group, PLLC

(57) ABSTRACT

A data processing device includes an instruction executing part executing a normal task and a management task scheduling an execution order of the normal task with switching the normal task and the management task, a counter measuring an execution state of the normal task being executed in the instruction executing part, and a state controller controlling the counter based on the normal task being executed in the instruction executing part. The instruction executing part determines whether the normal task to be executed next of a plurality of normal tasks scheduled by the management task is a measurement object or not, and outputs an operation signal notifying the state controller of the determination result. The state controller operates the counter in accordance with the branch operation.

17 Claims, 13 Drawing Sheets

PROCESSING SYSTEM FOR SWITCHING BETWEEN EXECUTION OF A NORMAL TASK AND A MANAGEMENT TASK

BACKGROUND

1. Field of the Invention

The present invention relates to a data processing device and a method of controlling the same, and more particularly, to a data processing device including a counter measuring an execution state of a task, and a method of controlling the data processing device.

2. Description of Related Art

In recent years, a multi-task operation in which a plurality of tasks are operated in time division has been executed in data processing devices such as micon. In the multi-task operation, the execution time is allocated for each task, and when the execution time of the task reaches a predetermined time, an interruption request is generated in the task and the process is made back to Operating System (OS) so as to execute other tasks again. In order to realize this technique, the data processing device in which the multi-task operation is executed includes a timer measuring the execution time of each task.

This timer can be configured with software or hardware. In the case of the software, while an operation of switching tasks is executed in software, the timer cannot stop counting or restart counting. In this case, the measurement time may not be accurate. On the other hand, when the timer is implemented in the hardware, the timer can stop counting or restart counting while the tasks are switched. Japanese Unexamined Patent Application Publication No. 10-247146 discloses a technique in which the timer is formed by the hardware so as to measure the task execution time with accuracy.

In the technique disclosed in Japanese Unexamined Patent Application Publication No. 10-247146, a Central Processing Unit (CPU) includes a timer control register. The timer control register provides a bit for designating whether or not a timer is operated by synchronizing with an execution mode and a bit for designating the mode operating the timer by synchronizing with the execution mode. When the timer is operated by synchronizing with the execution mode, the bit designating whether or not the timer is operated by synchronizing with the execution mode is set to 1, and when not, the bit is set to 0. The bit designating the mode operating the timer by synchronizing with the execution mode is set to 1 when the timer is operated in a privilege mode, and is set to 0 when operated in a non-privilege mode. In Japanese Unexamined Patent Application Publication No. 10-247146, it is possible to accurately measure the execution time of the task for each execution mode by controlling the operation of the timer by the CPU referring to these bits. A technique of measuring the execution time of the task by the hardware is also disclosed in Japanese Unexamined Patent Application Publication Nos. 2004-504667, 2000-322277, and 2-271437.

SUMMARY

The present inventors have found a problem as follows. In the technique disclosed in Japanese Unexamined Patent Application Publication No. 10-247146, only the execution mode operating the timer can be selected, and it is impossible to operate the timer only for the task which is selected among a plurality of tasks included in the same execution mode. Not all the tasks executed in the data processing device have limitation in the execution time, but some tasks have no limitation in the execution time even in the same execution mode. In the technique disclosed in Japanese Unexamined Patent Application Publication No. 10-247146, the timer is operated regardless of the type of the tasks as long as the tasks are included in the same execution mode, which means that it is impossible to control the operation mode and the stop mode of the timer for each task.

A first exemplary aspect of an embodiment of the present invention is a data processing device, including an instruction executing part executing a normal task and a management task scheduling an execution order of the normal task by switching the normal task and the management task by a branch operation, a counter measuring an execution state of the normal task being executed in the instruction executing part, and a state controller controlling the counter in accordance with the normal task being executed in the instruction executing part, in which the instruction executing part determines whether the normal task to be executed next of a plurality of normal tasks scheduled by the management task is a measurement object or not, and outputs an operation signal notifying the state controller of the determination result, and the state controller operates the counter in accordance with the branch operation from the management task to the normal task when it is notified by the operation signal that the normal task to be executed next is the measurement object.

A second exemplary aspect of an embodiment of the present invention is a method of controlling a data processing device, the data processing device including an instruction executing part executing a normal task and a management task scheduling an execution order of the normal task by switching the normal task and the management task by a branch operation, a counter measuring an execution state of the normal task being executed in the instruction executing part, and a state controller controlling the counter in accordance with the normal task being executed in the instruction executing part, the method including determining whether the normal task to be executed next of a plurality of normal tasks scheduled by the management task is a measurement object or not, and operating the counter in accordance with the branch operation from the management task to the normal task when the normal task to be executed next is determined as the measurement object.

According to the data processing device and the method of controlling the same in the present invention, it is determined whether the normal task to be executed next is the measurement object or not, and the state controller operates the counter based on the determination result. In the present invention, when the normal task to be executed next is the task of the measurement object, it is notified to the state controller that the task to be executed next is the measurement object before executing the normal task which is the measurement object. When the normal task is the measurement object, the state controller operates the counter in accordance with the branch operation from the management task to the normal task. In summary, according to the data processing device of the present invention, it is determined whether the task to be executed next is the measurement object to control whether or not the counter is to be operated based on the determination result. At this time, according to the present invention, the counter is controlled by task unit in the data processing device, which makes it possible to select any task for measurement without depending on the execution mode of the task.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

First Exemplary Embodiment

Figure 1:
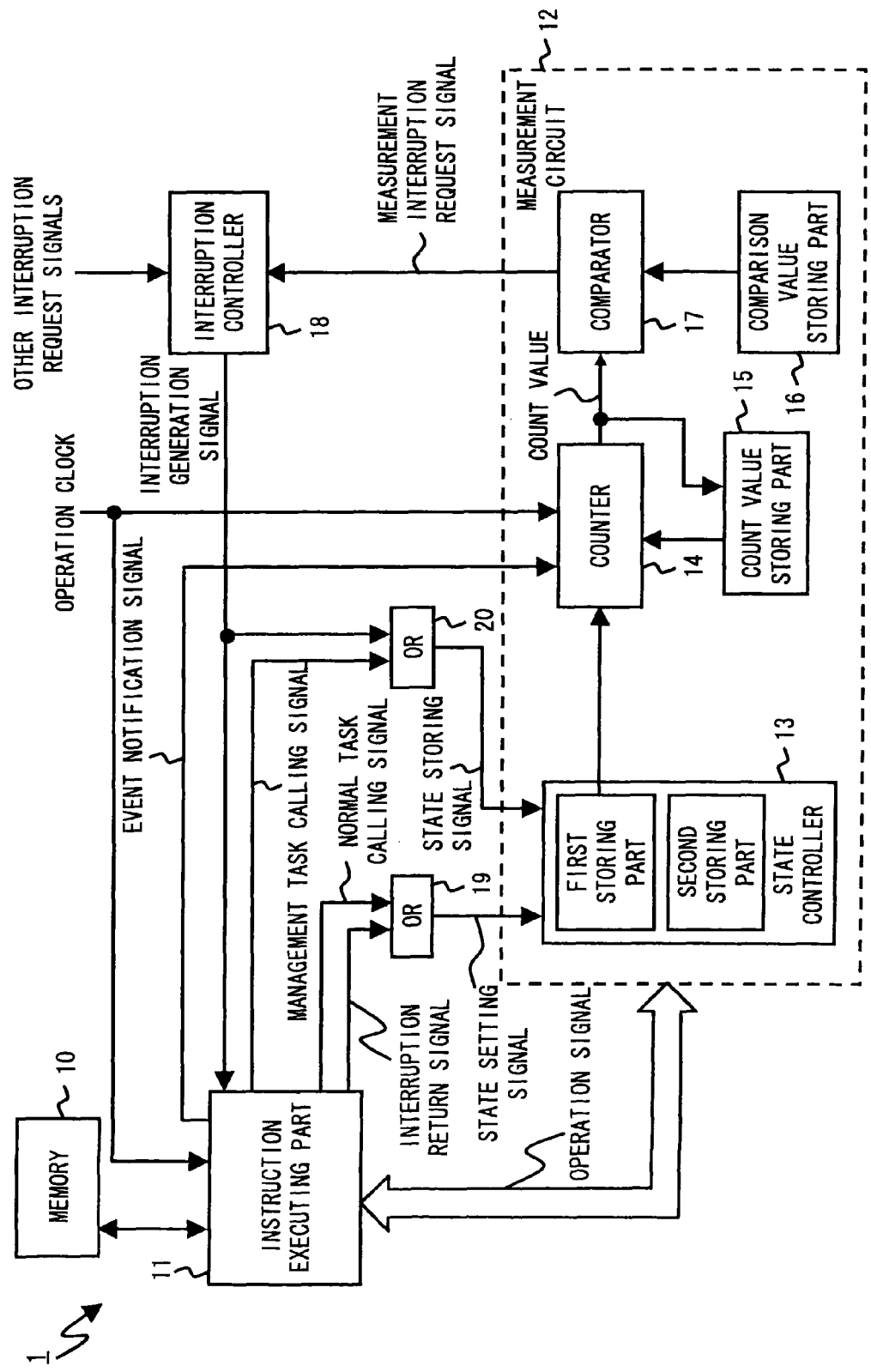
FIG. 1 is a block diagram of a data processing device according to a first exemplary embodiment.

Hereinafter, the exemplary embodiments of the present invention will be described with reference to the drawings. FIG. 1 shows a block diagram of a data processing device 1 according to the first exemplary embodiment. As shown in FIG. 1, the data processing device 1 includes a memory 10, an instruction executing part 11, a measurement circuit 12, an interruption controller 18, and OR circuits 19 and 20.

The memory 10 stores a program regarding a task executed in the instruction executing part 11 and intermediate information generated during the task operation. The instruction executing part 11 executes a task realizing a function provided by the data processing device 1. The instruction executing part 11 executes a management task scheduling the execution order of tasks, a normal task in which the execution order is scheduled by the management task, and an interruption task interrupting the management task or the normal task by switching these tasks by a branch operation. The instruction executing part 11 changes tasks to be execute, according to an instruction of calling the normal task, an instruction of calling a management task, an instruction of returning from interruption, or an interruption generation signal. In the first exemplary embodiment, the interruption generation signal is output from the interruption controller 18. Further, in the following description, the management task is described as a task of realizing a scheduling function of a plurality of functions implemented in the Operating System (OS), for example. The normal task includes a task for realizing each function of the user program and a task for realizing functions other than a scheduling function of the OS. In other words, even when the OS includes a task which is operated in special modes such as a privilege mode, for example, the normal task includes a task which is operated in these special modes. The interruption task includes a task which is not scheduled by the management task.

More specifically, when the instruction of calling the normal task is executed in the management task during a time at which the instruction executing part 11 executes the management task, the instruction executing part 11 switches the task to be executed from the management task to the normal task. The instruction executing part 11 outputs a signal of calling the normal task based on the instruction of calling the normal task. When the instruction of calling management task is executed in the normal task during a time at which the instruction executing part 11 executes the normal task, the instruction executing part 11 switches the task to be executed from the normal task to the management task. The instruction executing part 11 outputs the signal of calling management task based on the instruction of calling management task. When the interruption generation signal is received during a time at which the instruction executing part 11 executes the management task or the normal task, the instruction executing part 11 changes the management task or the normal task to the interruption task as the executed task. When the instruction of returning from interruption is executed in the interruption task during a time at which the instruction executing part 11 executes the interruption task, the instruction executing part 11 changes the executed task from the interruption task to the management task or the normal task. The task which becomes the branch destination after executing the interruption return instruction is the task designated by the interruption return instruction, and this task is not necessarily the branch source task. For example, the task may be moved to the management task or to the normal task after executing the interruption return instruction.

When the instruction executing part 11 executes the branch operation based on the interruption return instruction or the instruction of calling the normal task, it calls an operation state stored value which is memorized regarding the branch destination task. The instruction executing part 11 switches the executed tasks based on the operation state stored value. Especially, the management task generates the operation state stored value regarding the branch destination task before the instruction of calling the normal task. On the other hand, when the instruction executing part 11 performs the branch operation based on receiving of the interruption generation signal or the execution of the instruction of calling the management task, the operation information regarding the task being executed is stored as the operation state stored value to switch the tasks.

The instruction executing part 11 outputs an operation signal and an event notification signal according to the task to be executed. The operation signal is the control signal of the measurement circuit 12 and includes a plurality of signals. The event notification signal notifies the event such as an error generated according to the task to be executed. The instruction executing part 11 is supplied with the operation clock, and the instruction executing part 11 executes the task according to the operation clock.

The measurement circuit 12 includes a state controller 13, a counter 14, a count value storing part 15, a comparison value storing part 16, and a comparator 17. The state controller 13 includes a first storing part and a second storing part storing the operation set value indicating whether the task being executed in the instruction executing part 11 is the measurement object or not. In the first exemplary embodiment, the operation set value is set by the operation signal output to the second storing part by the instruction executing part 11 before executing the normal task. For example, when the normal task to be executed next of the normal tasks scheduled by the management task is the measurement object, a first value (1, for example) indicating the execution of the measurement is set as the operation set value; when the normal task to be executed next is out of the measurement object, a second value (0, for example) indicating the stop of the measurement is set as the operation set value. Then the state controller 13 moves the operation set value from the second storing part to the first storing part based on the signal of calling the normal task or an interruption return signal, and moves the operation set value from the second storing part to the first storing part based on the signal of calling the management task or the interruption generation signal. The detailed description of the state controller 13 will be made later.

The counter 14 starts or stops the measurement of the execution state of the task executed in the instruction executing part 11 based on the operation set value stored in the first storing part of the state controller 13. More specifically, the counter 14 counts one of the operation clocks supplied to the instruction executing part 11 and the event notification signal generated in the instruction executing part 11. It is determined which of the signals is counted by the counter 14 depending on the operation signal output from the instruction executing part 11. The count of these signals is started and executed when the operation set value stored in the first storing part is the first value, and is stopped when the operation set value stored in the first storing part is the second value. When the operation set value is the first value, the counter 14 reads out the value stored in the count value storing part, and outputs the value obtained by adding or subtracting the read value as the count value. When the operation set value is the second value, the value is directly output as the count value without adding or subtracting the value read out from the count value storing part.

The count value storing part 15 stores the count value output from the counter 14 based on the operation signal output from the instruction executing part 11 or outputs the count value that is stored to the counter 14. The comparison value storing part 16 stores the comparison value in accordance with the operation signal output from the instruction executing part 11. This comparison value is the reference value setting the output timing of a measurement interruption request signal. The comparator 17 outputs the comparison match result of the count value and the comparison value as the measurement interruption request signal. More specifically, the comparator 17 outputs the measurement interruption request signal when the count value is the value equal to or more than the comparison value.

The interruption controller 18 outputs the interruption generation signal based on the measurement interruption request signal output from the comparator 17 or the interruption request signals output from other peripheral devices. The OR circuit 19 outputs a result of performing the OR operation on the signal of calling normal task and the interruption return signal as a state setting signal. The OR circuit 20 outputs a result of performing the OR operation on the interruption generation signal and the signal of calling management task as the state storing signal.

Figure 2:
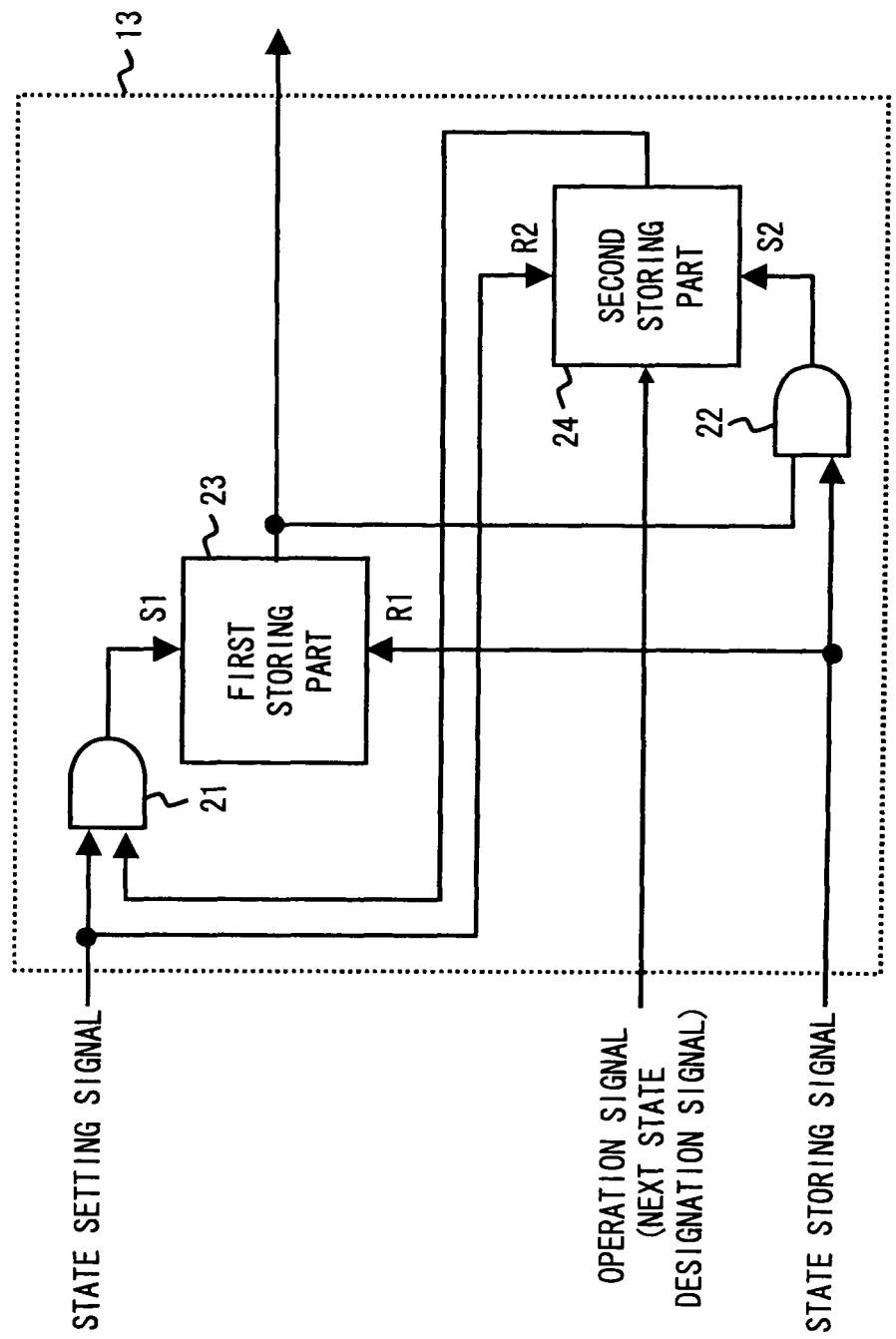
FIG. 2 is a block diagram of a state controller according to the first exemplary embodiment.

The detail of the state controller 13 will be described. FIG. 2 shows a block diagram of the state controller 13. As shown in FIG. 2, the state controller 13 includes AND circuits 21 and 22, a first storing part 23, and a second storing part 24. The AND circuit 21 receives the state setting signal and the output signal of the second storing part 24. The AND circuit 21 outputs a result of performing the AND operation on the two signals as a set signal S1. Note that the state setting signal is supplied to the second storing part 24 as a reset signal R2. The AND circuit 22 receives the state storing signal and the output signal of the first storing part 23. The AND circuit 22 outputs the result of performing the AND operation on the two signals as a set signal S2. The state storing signal is supplied to the first storing part 23 as a reset signal R1. The first storing part 23 stores the operation set value regarding the task being executed in the instruction executing part 11 and outputs the operation set value which is being stored to the counter 14. Then, the first storing part 23 sets the operation set value to 0 according to the reset signal R1, and sets the operation set value to 1 according to the set signal S1. The second storing part 24 stores the operation set value of the task to be executed next in the instruction executing part 11. Then the second storing part 24 sets the operation set value to 0 according to the reset signal R2 and sets the operation set value to 1 according to the set signal S2. The second storing part 24 receives a next state designation signal included in the operation signal. When the next state designation signal is input, the second storing part 24 sets the value designated by the next state designation signal as the operation set value to be stored regardless of the set signal S2 and the reset signal R2. For example, when the next state designation signal indicates 1, the operation set value is set to 1; when the next state designation signal indicates 0, the operation set value is set to 0.

Next, the operation of the state controller 13 will be described. In the first exemplary embodiment, one bit value is employed as the operation set value. Note that the operation set value and the stored value are not necessarily the value of one bit but can be formed of a plurality of bits.

First, description will be made on a first case in which both of the values stored in the first storing part 23 and the second storing part 24 are 0. Since one of the inputs of the AND circuits 21 and 22 is 0 in the first case, the set signals S1 and S2 keep 0 for the change of the value of the state setting signal or the state storing signal. In summary, the values stored in the first storing part 23 and the second storing part 24 do not change in the first case.

A second case is that one of the values stored in the first storing part 23 and the second storing part 24 is 1 and the other is 0. In this case, when the signal input to the AND circuit supplying the set signal to the storing part in which 0 is stored is changed from 0 to 1, the set signal output from the AND circuit becomes 1. Hence, the value of the storing part in which 0 is stored becomes 1. On the other hand, the reset signal input to the storing part in which 1 is stored also becomes 1; therefore, the value of the storing part in which 1 is stored is 0. In the second case, the values of the two storing parts are apparently exchanged. More specifically, when the state storing signal is changed from 0 to 1 in a case where 1 is set as the value of the second storing part 24 and 0 is set as the value of the first storing part 23, the set signal S1 becomes 1 based on the value (in this case, 1) stored in the second storing part 24; hence, the value of the first storing part 23 is set to 1. Since the reset signal R2 is set to 1, the value of the second storing part 24 is set to 0. On the other hand, when the state setting signal is changed from 0 to 1 in a case where 0 is set as the value of the second storing part 24 and 1 is set as the value of the first storing part 23, the value of the second storing part 24 is set to 1 as the set signal S2 becomes 1 based on the value (in this case, 1) stored in the first storing part 23. The value of the first storing part 23 is set to 0 as the reset signal R1 is set to 1.

A third case is that both of the values stored in the first storing part 23 and the second storing part 24 are 1. In the third case, both of the inputs of the AND circuit 22 are 1 when the state storing signal changes from 0 to 1; therefore, the set signal S2 becomes 1. Hence, the value stored in the second storing part 24 keeps 1. On the other hand, the value stored in the second storing part 24 becomes 0 as the reset signal R1 supplied to the first storing part 23 changes from 0 to 1 according to the state storing signal. Further, when the state setting signal is raised from 0 to 1, both of the inputs of the AND circuit 21 become 1; therefore, the set signal S1 becomes 1. Accordingly, the value stored in the first storing part 23 keeps 1. On the other hand, the reset signal R2 supplied to the second storing part 24 changes from 0 to 1 in accordance with the state setting signal; therefore, the value stored in the second storing part 24 becomes 0. In the third case, when the state storing signal becomes 1, the value of the first storing part 23 becomes 0 and the second storing part 24 keeps the value of 1. When the state setting signal becomes 1, the value of the second storing part 24 becomes 0 and the value of the first storing part 23 becomes 1. In summary, the value of the first storing part 23 is 0 when the state storing signal becomes 1, and the value of the second storing part 24 becomes 0 when the state setting signal becomes 1.

Figure 3:
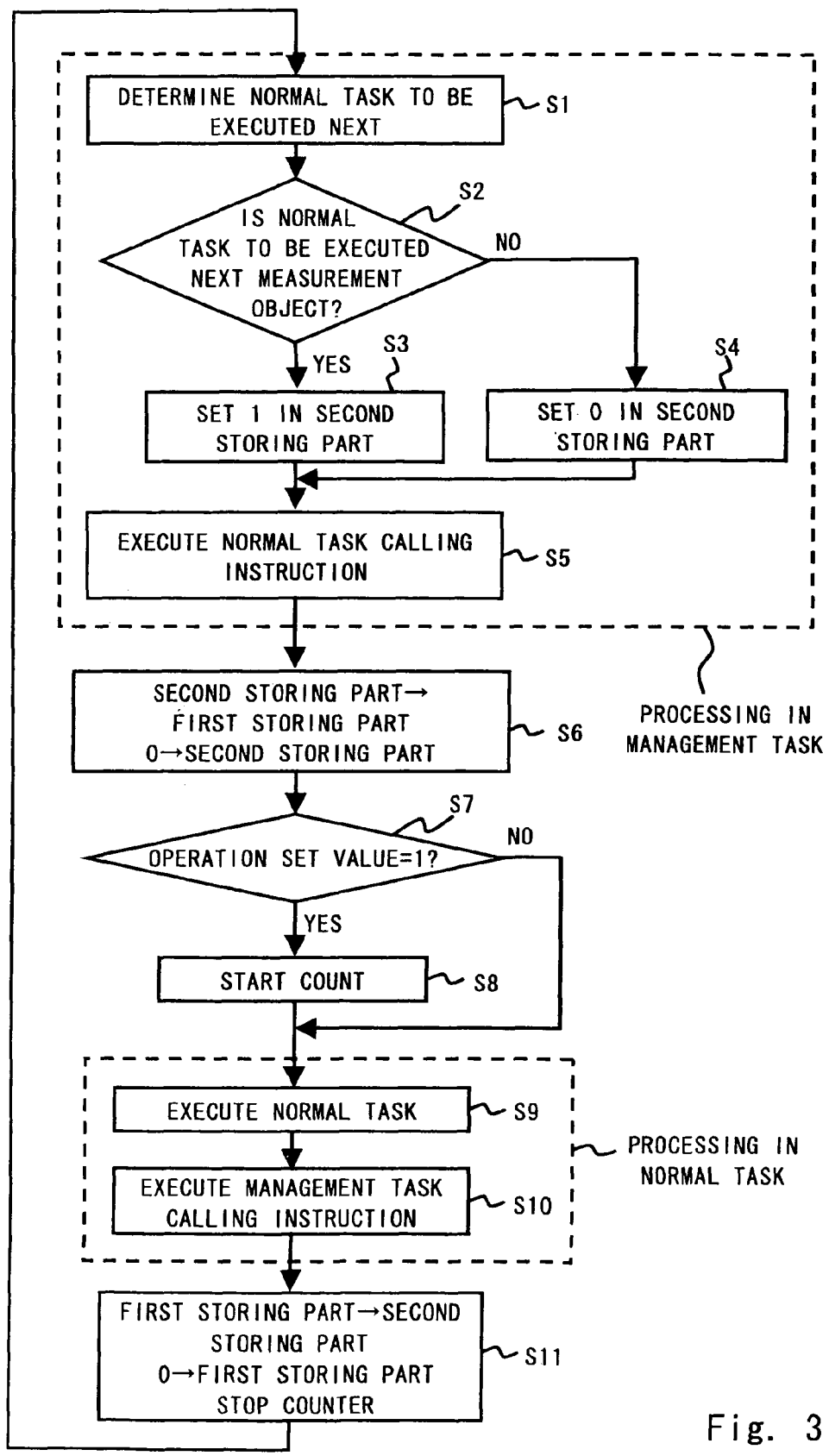
FIG. 3 is a flow chart showing an operation of the data processing device when a normal task is executed in the first exemplary embodiment.

Next, the operation of the data processing device 1 will be described with reference to FIG. 3, which is a flow chart showing the operation of the data processing device 1. A first step in the example shown in FIG. 3 is the scheduling operation of the normal task which is executed next in the management task (step S1). It is determined in the management task whether the normal task which is executed next is the measurement object or not (step S2). When it is determined that the normal task which is executed next is the measurement object in step S2 (step S2: Yes), the instruction executing part 11 outputs the next state designation signal and sets the first value (1, for example) as the operation set value indicating that the next normal task is the measurement object in the second storing part 24 (step S3). When it is determined in step S2 that the normal task which is executed next is out of the measurement object (step S2: No), the instruction executing part 11 outputs the next state designation signal and sets the second value (0, for example) as the operation set value indicating that the next normal task is the measurement object in the second storing part 24 (step S4). Then the management task executes the instruction of calling the normal task (step S5).

Then, the state controller 13 sets the operation set value stored in the second storing part 24 to the operation set value of the first storing part 23 according to the signal of calling the normal task generated along with the switch of the tasks in step S5 to set the value of the second storing part 24 to 0 (step S6). When the operation set value stored in the first storing part 23 is 1 (step S7: Yes), the counter starts the operation. Then the normal task which is called is executed (step S9). On the other hand, when the operation set value stored in the first storing part 23 is 0 (step S7: No), the counter does not measure, and the instruction executing part 11 executes the task without performing the measurement of the task (step S9).

Then, the instruction of calling management task is executed in the normal task being executed in the instruction executing part 11 (step S10). The instruction executing part 11 outputs the signal of calling the management task according to the execution of the instruction of calling the management task. The state controller 13 stores the operation set value stored in the first storing part 23 in the second storing part 24 in accordance with the instruction of calling the management task. The value stored in the first storing part 23 is set to 0. The counter 14 stops the operation as the value stored in the first storing part 23 becomes 0 (step S11). Then, the instruction executing part 11 moves the task to be executed from the normal task to the management task, and again performs the scheduling operation of the management task.

Figure 4:
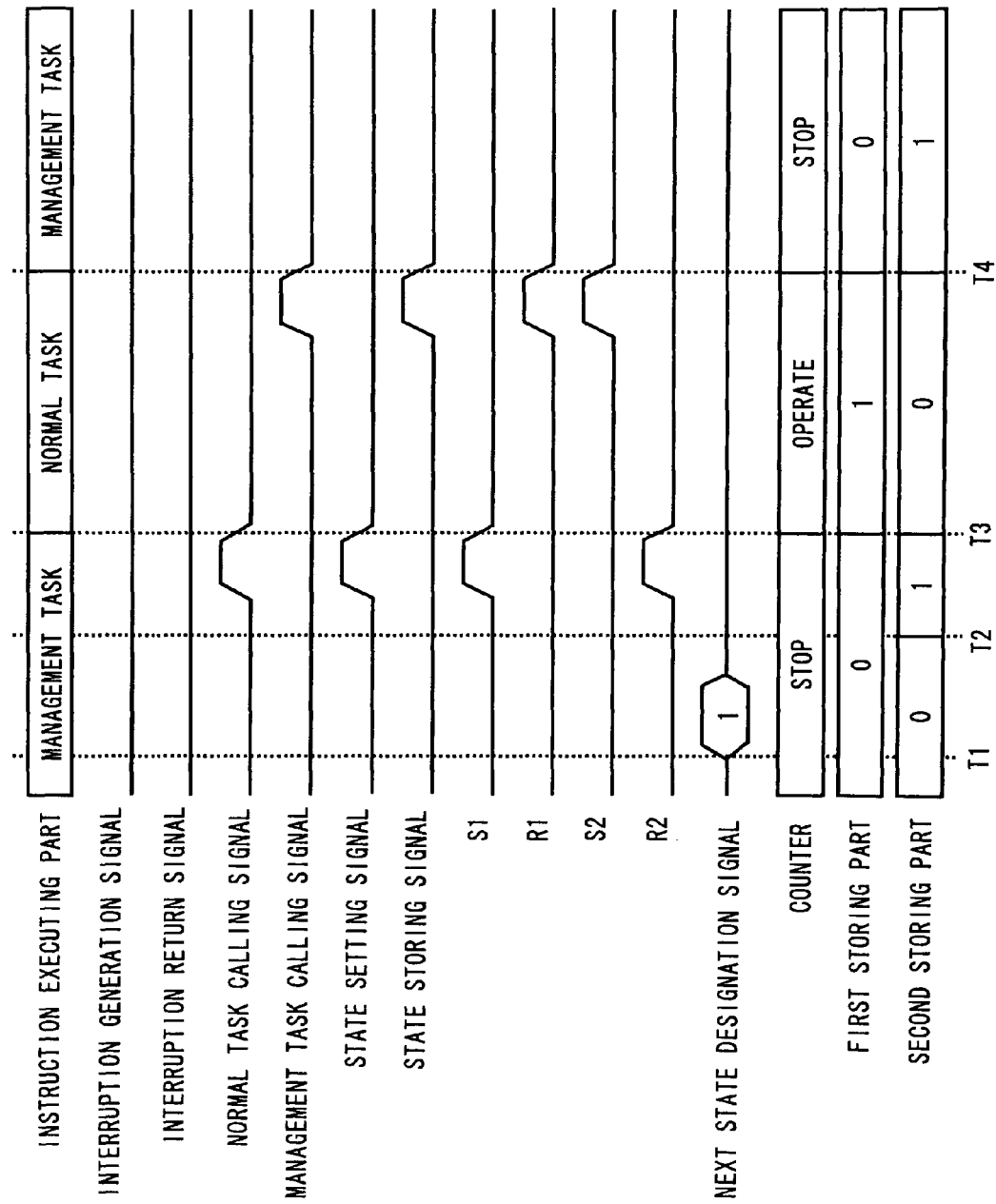
FIG. 4 is a timing chart showing the operation of the state controller when the normal task is executed in the first exemplary embodiment.

Now, the operation of the data processing device 1 along with the flow chart of FIG. 3 will be described along with a timing chart shown in FIG. 4. As shown in FIG. 4, in the data processing device 1, the instruction executing part 11 outputs the next state designation signal based on the scheduling operation of the management task at timing T1. The example in FIG. 4 shows a case in which the normal task to be executed next is the measurement object. At this time, the next state designation signal output from the instruction executing part 11 designates the value of 1. At timing T2, the operation set value indicating the first value is set in the second storing part 24 in accordance with the next state designation signal. When the instruction of calling normal task is executed in the management task, the signal of calling the normal task is raised. Further, the state setting signal, the set signal S1, and the reset signal R2 are raised in accordance with the rising of the signal of calling the normal task. Then, the state setting signal, the set signal S1, and the reset signal R2 are fallen in accordance with the falling of the signal of calling the normal task at timing T3. Then, the operation set value stored in the second storing part 24 moves to the first storing part 23 and 0 is set in the second storing part 24 in the state controller 13 in accordance with the falling of the set signal S1 and the reset signal R2 at timing T3. Further, the operation set value stored in the first storing part 23 becomes the first value due to the operation of the state controller 13, whereby the counter 14 starts the operation.

Next, when the instruction of calling the management task is executed in the normal task, the signal of calling the management task is raised. Further, the state storing signal, the set signal S2, and the reset signal R1 are raised in accordance with the rising of the signal of calling the management task. Then, the state storing signal, the set signal S2, and the reset signal R1 are fallen in accordance with the falling of the signal of calling the normal task at timing T4. Then, the operation set value stored in the first storing part 23 moves to the second storing part 24 and 0 is set in the first storing part 23 in the state controller 13 in accordance with the falling of the set signal S2 and the reset signal R1 at timing T4. The value of the first storing part 23 becomes 0 due to the operation of the state controller 13, whereby the counter 14 stops the operation.

Figure 5:
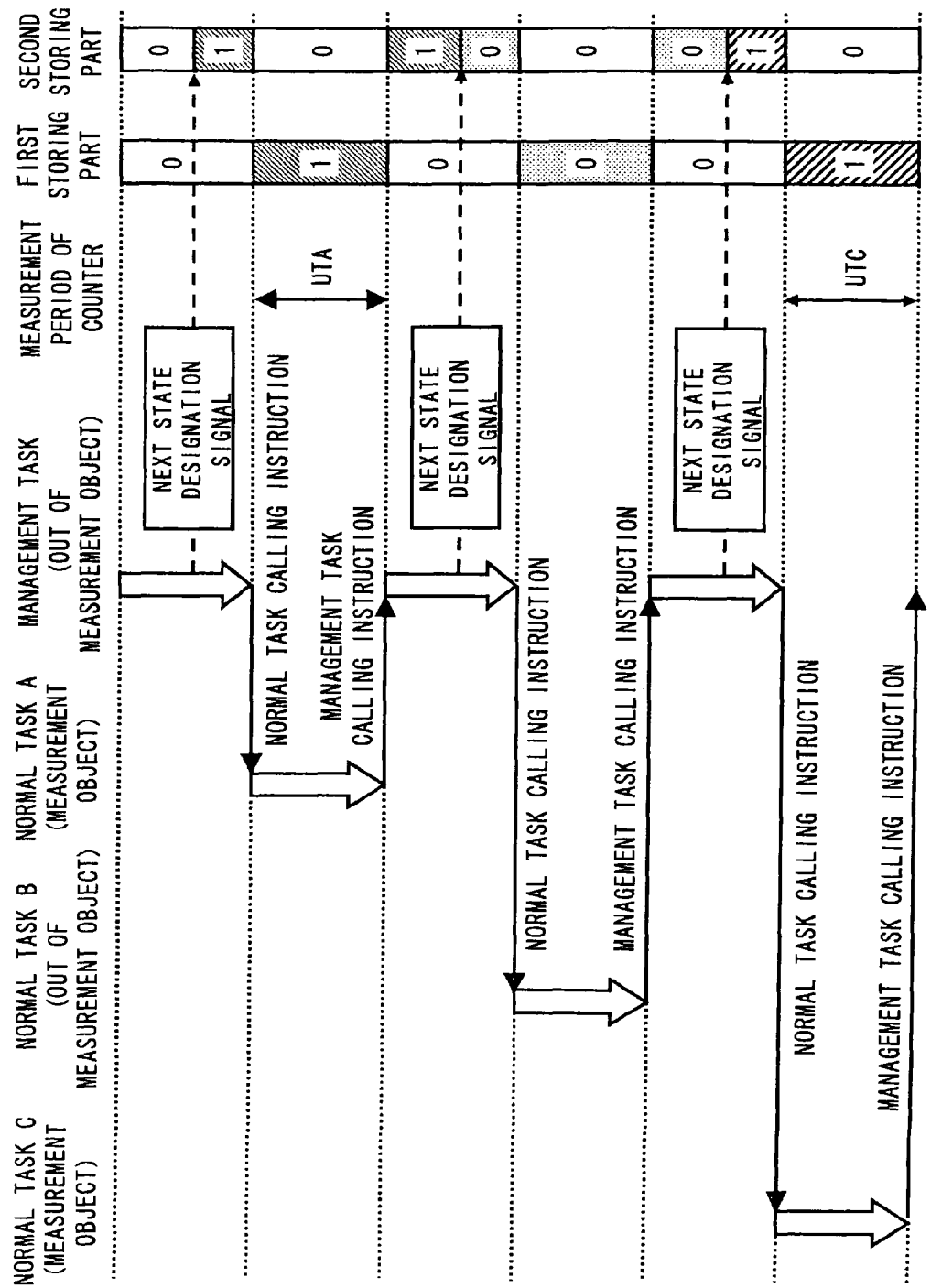
FIG. 5 is a sequence diagram showing the operation of the data processing device when the normal task is executed in the first exemplary embodiment.

Now, the operation of the data processing device 1 will be described further with reference to FIG. 5, which is a sequence diagram showing an example of the operation of the data processing device 1. FIG. 5 shows an example in which the normal tasks A and C which are the tasks of the measurement object, and the normal task B which is out of the measurement object are executed in the instruction executing part 11. Further, the counter 14 measures the execution time of the task of the measurement object by counting the operation clock. The example shown in FIG. 5 is the operation realized by repeatedly executing the flow chart shown in FIG. 3.

As shown in FIG. 5, 0 is set in the first storing part 23 during a time at which the management task out of the measurement object is executed. Therefore, the counter 14 does not measure. Further, since the normal task A which is to be executed next is the task of the measurement object, the instruction executing part 11 executing the management task outputs the next state designation signal, and the operation set value stored in the second storing part 24 is set to the first value (1, for example). When the instruction of calling the normal task is executed in the management task, the instruction executing part 11 changes the executed task the management task to the normal task A. The operation set value stored in the second storing part 24 moves to the first storing part 23 in synchronization with the switch of the tasks, and 0 is set in the second storing part 24. Accordingly, since the first value is set as the operation set value in the first storing part 23, the counter 14 starts the operation in synchronization with the switch of the tasks to measure the execution time of the normal task A. The time which is measured here is called time UTA.

When the instruction of calling the management task is executed in the normal task A, the instruction executing part 11 changes the executed task the normal task A to the management task. The instruction executing part 11 outputs the signal of calling the management task along with the execution of the instruction of calling the management task. Accordingly, the operation set value stored in the first storing part 23 is moved to the second storing part 24 in synchronization with the signal of calling the management task to set 0 in the first storing part 23 in the state controller 13. Accordingly, the value of the first storing part 23 becomes the second value indicating a state in which the measurement is stopped, whereby the counter 14 stops the operation.

Next, since the normal task B which is to be executed next is the task out of the measurement object, the instruction executing part 11 executing the management task outputs the next state designation signal and sets the operation set value stored in the second storing part 24 to the second value (0, for example). When the instruction of calling the normal task is executed in the management task, the instruction executing part 11 switches the task to be executed from the management task to the normal task B. The operation set value stored in the second storing part 24 moves to the first storing part 23 in synchronization with the switch of the tasks, and 0 is set in the second storing part 24. Accordingly, since the second value is set in the first storing part 23 as the operation set value, the counter 14 keeps the stop state even when the tasks are switched.

When the instruction of calling the management task is executed in the normal task B, the instruction executing part 11 switches the task to be executed from the normal task B to the management task. The instruction executing part 11 outputs the signal of calling the management task along with the instruction of calling the management task. Accordingly, the operation set value stored in the first storing part 23 is moved to the second storing part 24 in synchronization with the signal of calling the management task to set 0 in the first storing part 23 in the state controller 13. Accordingly, the value of the first storing part 23 becomes the second value indicating the state in which the measurement is stopped, whereby the counter 14 keeps the stop state.

Next, since the normal task C which is to be executed next is the task of the measurement object, the instruction executing part 11 executing the management task outputs the next state designation signal to set the operation set value stored in the second storing part 24 to the first value (1, for example). When the instruction of calling the normal task is executed in the management task, the instruction executing part 11 switches the task to be executed from the management task to the normal task C. Further, the operation set value stored in the second storing part 24 moves to the first storing part 23 in synchronization with the switch of the tasks, and 0 is set in the second storing part 24. Accordingly, since the first value is set as the operation set value in the first storing part 23, the counter 14 starts the operation in synchronization with the switch of the tasks to measure the execution time of the normal task A. The time measured at this time is called time UTC.

When the instruction of calling the management task is executed in the normal task C, the instruction executing part 11 switches the task to be executed from the normal task C to the management task. Further, the instruction executing part 11 outputs the signal of calling the management task based on the execution of the instruction of calling the management task. Accordingly, the operation set value stored in the first storing part 23 is moved to the second storing part 24 in synchronization with the signal of calling the management task to set 0 in the first storing part 23 in the state controller 13. Accordingly, the value of the first storing part 23 becomes the second value indicating the state in which the measurement is stopped, whereby the counter 14 stops the operation.

Figure 6:
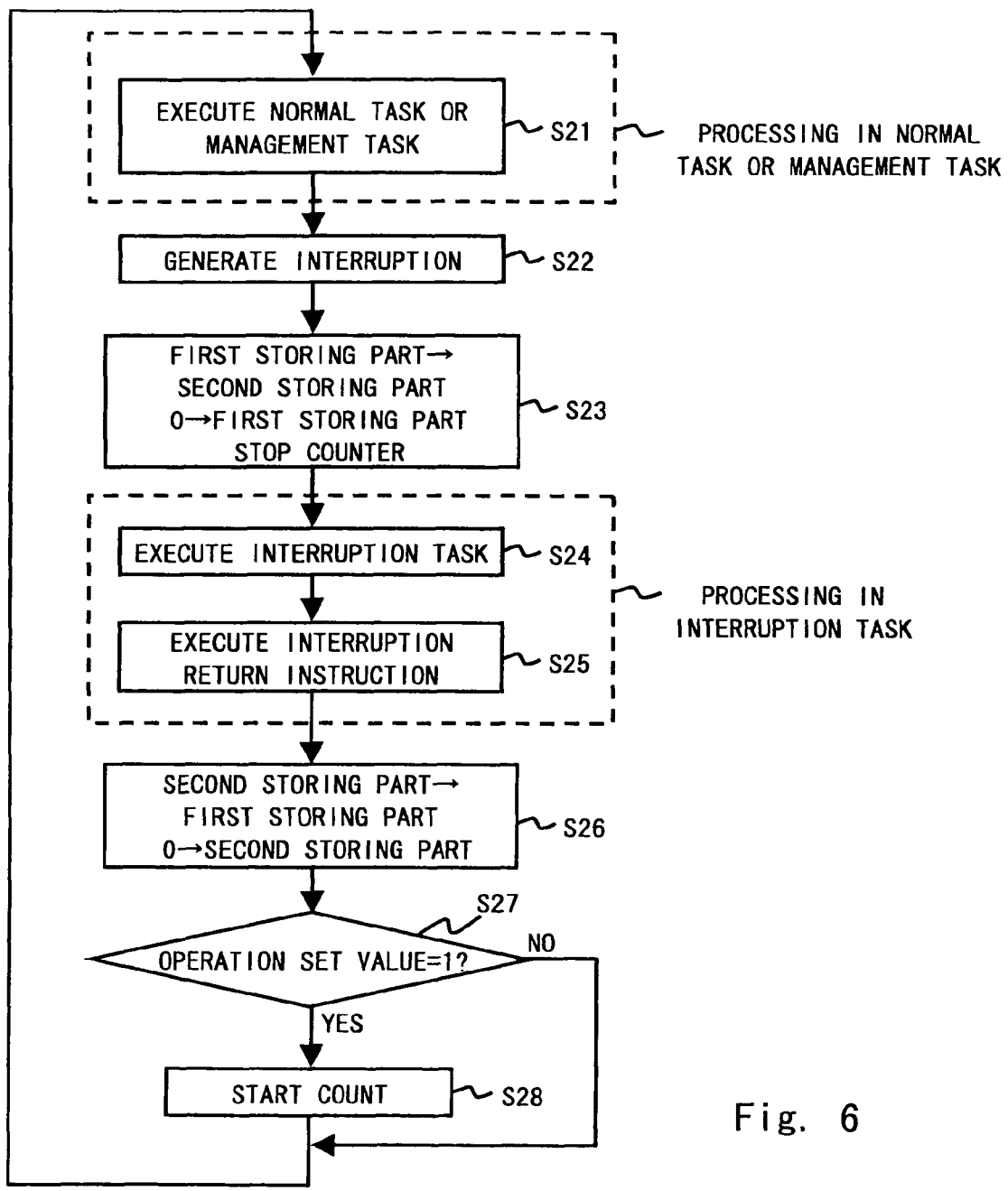
FIG. 6 is a flow chart showing the operation of the data processing device when an interruption task is generated in the first exemplary embodiment.

The above description concerns the operation of a case in which the management task and the normal task are switched. In the following description, the operation of the data processing device 1 of a case in which the interruption task interrupts the management task or the normal task will be described. FIG. 6 shows a flow chart showing the operation of the data processing device 1 when the interruption task is interrupted.

The first step of the example shown in FIG. 6 is a state in which the management task or the normal task is being executed in the instruction executing part 11 (step S21). When the interruption generation signal is input to the instruction executing part 11 during a time at which the management task or the normal task is being executed, the instruction executing part 11 moves the task to be executed to the interruption task generating the interruption generation signal (step S22). The instruction executing part 11 outputs the signal of calling the management task in accordance with the interruption generation signal. The state controller 13 stores the operation set value stored in the first storing part 23 in the second storing part 24 in accordance with the instruction of the management task. Further, the value stored in the first storing part 23 is set to 0. The counter 14 stops the operation as the value stored in the first storing part 23 becomes 0 (step S23). Then the instruction executing part 11 executes the interruption task (step S24).

The interruption return instruction is executed in the interruption task executed in step S24. The instruction executing part 11 outputs the interruption return signal in accordance with the execution of the interruption return instruction. Then, the state controller 13 sets the operation set value stored in the second storing part 24 to the operation set value of the first storing part 23, and sets the value of the second storing part 24 to 0 (step S26). When the operation set value stored in the first storing part 23 is 1 (step S27: Yes), the counter starts the operation. Then, the normal task or the management task which is called is executed. On the other hand, when the operation set value stored in the first storing part 23 is 0 (step S27: No), the counter does not measure, and the instruction executing part 11 executes the normal task or the management task which is called without performing the measurement of the task.

Figure 7:
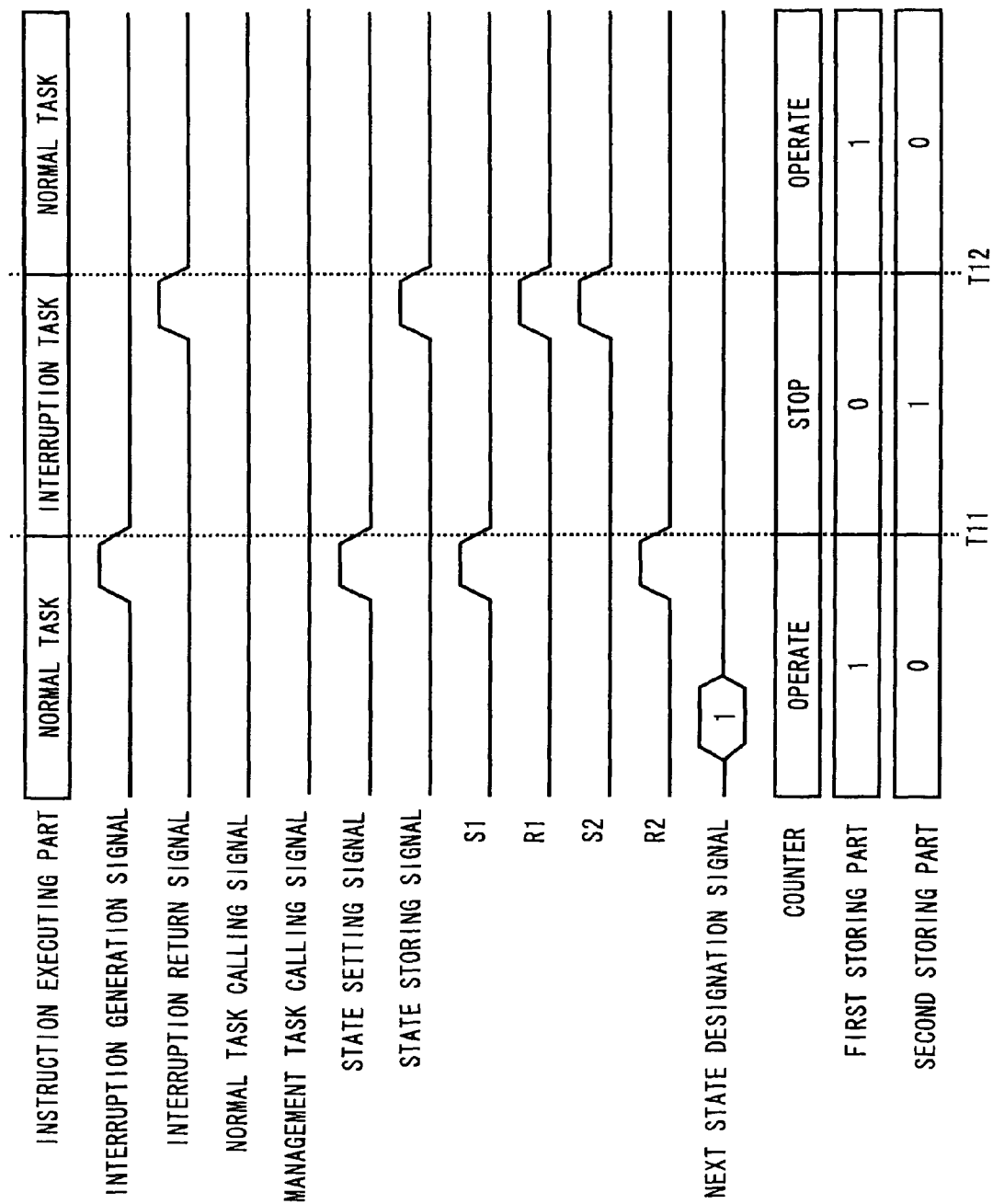
FIG. 7 is a timing chart showing the operation of the state controller when the interruption task is generated in the first exemplary embodiment.

Now, the operation of the data processing device 1 referring to the flow chart of FIG. 6 will be described along with a timing chart shown in FIG. 7. FIG. 7 shows an example in which the interruption task interrupts the execution of the normal task. As shown in FIG. 7, when the interruption generation signal is raised during a time at which the normal task is being executed, the state storing signal, the set signal S2, and the reset signal R1 are raised in accordance with the rising of the signal in the data processing device 1. Then, the state storing signal, the set signal S2, and the reset signal R1 are fallen in accordance with the falling of the interruption generation signal at timing T11. Then, the operation set value stored in the first storing part 23 moves to the second storing part 24 and 0 is set in the first storing part 23 in the state controller 13 in accordance with the falling of the set signal S2 and the reset signal R1 at timing T11. Since the operation set value stored in the first storing part 23 is the second value due to the operation of the state controller 13, the counter 14 stops the operation.

When the interruption return instruction is executed in the interruption task, the interruption return signal is raised. Further, the state setting signal, the set signal S1, and the reset signal R2 are raised in accordance with the rising of the interruption return signal. The state setting signal, the set signal S1, and the reset signal R2 are fallen in accordance with the falling of the interruption return signal at timing T12. The operation set value stored in the second storing part 24 moves to the first storing part 23 and 0 is set in the second storing part 24 in the state controller 13 in accordance with the falling of the set signal S1 and the reset signal R2 at timing T12. Since the value of the first storing part 23 becomes the first value due to the operation of the state controller 13, the counter 14 starts the operation.

Figure 8:
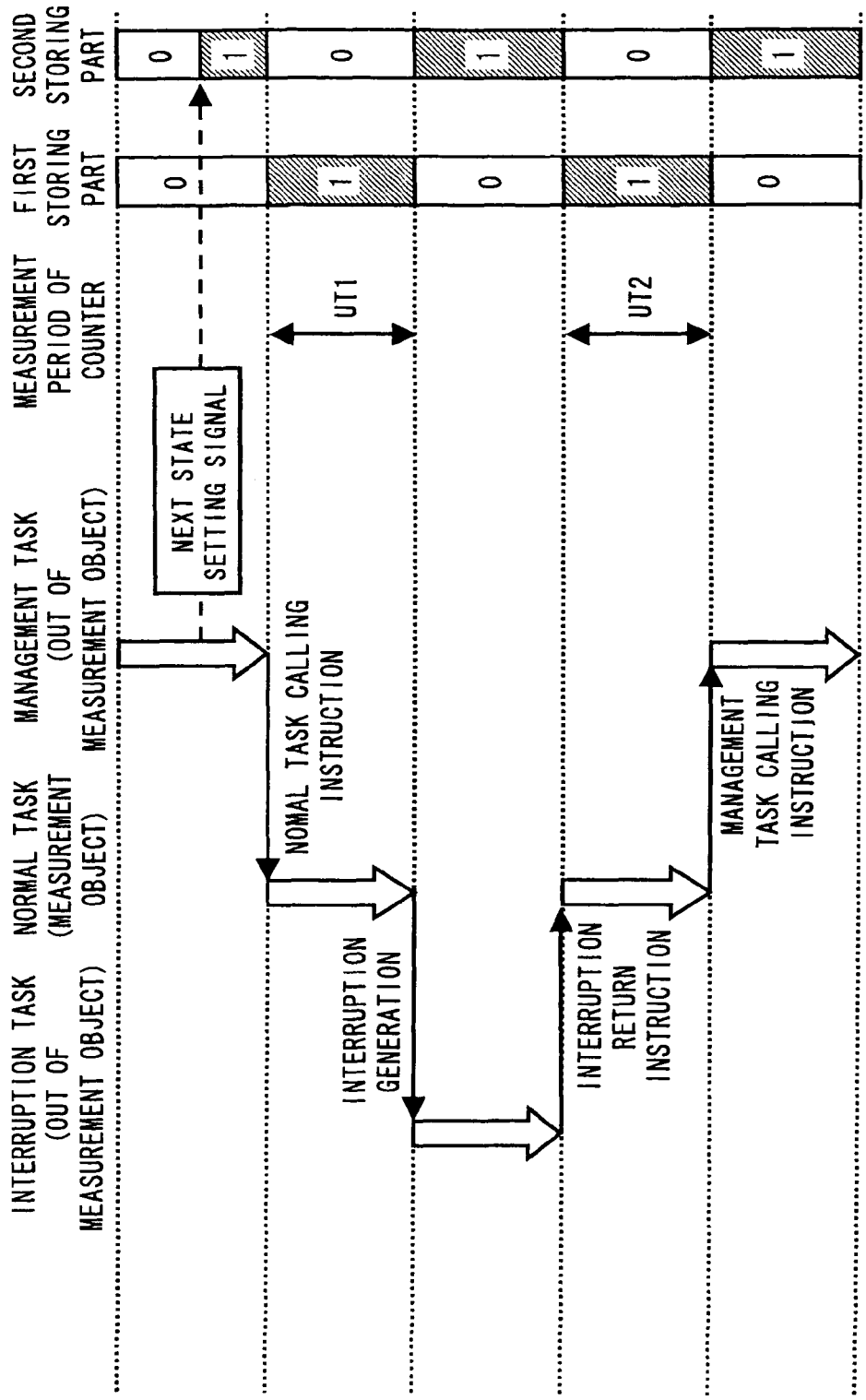
FIG. 8 is a sequence diagram showing the operation of the data processing device when the interruption task is generated in the first exemplary embodiment.

Now, the operation of the data processing device 1 will be described further with reference to FIG. 8, which is a sequence diagram showing an example of the operation of a case in which the interruption task is executed in the data processing device 1. FIG. 8 shows an example in which the normal task which is the task of the measurement object, the management task which is the task out of the measurement object, and the interruption task are executed in the instruction executing part 11. In FIG. 8, the counter 14 measures the execution time of the task of the measurement object by counting the operation clock. FIG. 8 shows an example in which the interruption task is interrupted during a time at which the user task is being executed and the measurement time is interrupted.

As shown in FIG. 8, the operation set value indicates 0 during a time at which the management task out of the measurement object is executed; therefore, the counter 14 does not operate at this time. Further, the instruction executing part 11 executing the management task outputs the next state designation signal to set the first value as the operation set value in the second storing part 24 since the user task to be executed next is the task of the measurement object. When the instruction of calling the normal task is executed in the management task, the task executed in the instruction executing part 11 is switched from the management task to the normal task. Further, the operation set value stored in the second storing part 24 moves to the second storing part 24 in synchronization with the switch of the tasks, and 0 is set in the second storing part 24. Since the operation set value stored in the first storing part 23 becomes 1, the counter 14 starts the operation in synchronization with the switch of the tasks and measures the execution time of the user task. The time measured here is called time UT1.

When the interruption request by the interruption task is generated during a time at which the normal task is executed, the instruction executing part 11 switches the task to be executed from the normal task to the interruption task based on the interruption generation signal. Further, the operation set value stored in the first storing part 23 is moved to the second storing part 24 in the state controller 13 and 0 is set as the value of the first storing part 23 based on the interruption generation signal. Accordingly, the operation set value during a period at which the normal task is executed is stored in the second storing part 24. Since 0 is stored in the first storing part 23, the counter 14 stops the operation in synchronization with the switch of the tasks. Here, in the data processing device 1, the count value output from the counter 14 when the tasks are switched is stored in the count value storing part based on the interruption generation signal.

Along with the advancement of the interruption task, the interruption task executes the interruption return instruction. Accordingly, the task executed by the instruction executing part 11 becomes the normal task of the branch source. The instruction executing part 11 outputs the interruption return signal in accordance with the execution of the interruption return instruction. The state controller 13 moves the operation set value stored in the second storing part 24 to the first storing part 23 to set 0 in the second storing part 24 in accordance with the interruption return signal. Accordingly, the operation set value stored in the first storing part 23 becomes the first value. Further, in the data processing device 1, the count value stored in the count value storing part 15 is set in the counter 14 in accordance with the interruption return signal. Then the counter 14 restarts the measurement of the execution time of the user task in accordance with the switch of the operation set values. The time measured by the counter 14 after restart of the measurement is called time UT2.

When the instruction of calling the management task is executed in the normal task, the instruction executing part 11 switches the task to be executed from the normal task to the management task. At this time, the instruction executing part 11 outputs the signal of calling the management task. The state controller 13 moves the operation set value stored in the first storing part 23 to the second storing part 24 to set 0 as the value of the first storing part 23 based on the signal of calling the management task.

From the above description, the data processing device 1 according to the first exemplary embodiment stores the operation set value regarding the normal task to be executed next in the second storing part 24 before the task is switched from the management task to the normal task. Then the operation set value stored in the second storing part 24 is moved to the first storing part 23 in synchronization with the switch of the tasks. Accordingly, the counter 14 is able to measure the execution state of the normal task without error. Even when the interruption task is interrupted during a time at which the normal task is executed, the operation set value stored in the first storing part 23 is stored in the second storing part 24 in synchronization with the switch of the tasks, and the operation set value stored in the second storing part 24 is moved back to the first storing part 23 in synchronization with the switching from the interruption task to the normal task. Accordingly, even in a case in which the interruption task is interrupted during a time at which the normal task is executed and the execution time of the normal task is divided, it is possible to execute the measurement of the normal task with accuracy. For example, in the example shown in FIG. 8, the measurement time UT1 and the measurement time UT2 are added so as to be able to measure the time of the normal task with accuracy.

In the data processing device 1, the counter 14 measures the operation clock so as to be able to measure the execution time of the task. At this time, it is detected in the data processing device 1 using the comparator 17 that the count value of the counter 14 reaches the comparison value to output the detection result as the measurement interruption request signal, so as to be able to operate the measurement circuit 12 as a timer. Further, when the counter 14 notifies the event notification signal, the error generated during the execution of the task can be counted, for example. Since the counter 14 measures the event notification signal to obtain the information regarding in which task the error occurs, it is possible to improve the efficiency of debugging of the program regarding the tasks, for example.

Further, as shown in the example of FIG. 5, in the data processing device 1, it is determined in the instruction executing part 11 executing the management task whether the normal task to be executed next is the measurement object or not, so as to set the operation set value in the second storing part 24 based on the determination result before the execution of the next normal task. Then, the operation set value stored in the second storing part 24 is stored in the first storing part 23 in synchronization with the switch of the tasks in the instruction executing part 11. Accordingly, any task can be selected as the measurement object without depending on the execution mode of the normal task. As such, the normal task which is the measurement object is selected as appropriate, whereby only the state of the execution of the normal task which is currently been examined can be measured without performing the measurement of the state of the execution on the normal task where the examination has already been completed, for example. Accordingly, only the information needed for debugging of the program regarding the normal task can be obtained, for example, which improves the efficiency of the debugging of the program.

Furthermore, it is possible to omit the setting regarding the normal task which has no limitation in the execution time in the multi-task operation. The related art requires the operation of storing the time unduly long as the execution time in the comparison value storing part, for example, when there is included in the same execution mode a normal task which has no limitation in the execution time. However, according to the data processing device 1 of the first exemplary embodiment, it is possible to select whether to perform the measurement for each normal task. Therefore, there is no need to set the comparison value regarding the normal task which has no limitation included in the same execution mode. Accordingly, the data processing device 1 according to the first exemplary embodiment makes it possible to reduce the number of processes in performing the setting of the task schedule.

Second Exemplary Embodiment

In a data processing device according to the second exemplary embodiment, the operation state of the interruption task is measured when the interruption task in the first exemplary embodiment is the measurement object. Since the interruption task is not the object of the schedule by the management task, it is not possible to set the operation set value based on the management task. In such a case, the instruction executing part 11 rewrites the operation set value in accordance with the saving operation executed in the interruption task, so that the counter 14 is able to measure the execution state of the interruption task. Further, in the saving operation, the operation set value corresponding to the normal task is saved in the memory as a saving context when the interruption task is executed. Further, the interruption task executes the recovery operation which forms a pair with the saving operation. In the recovery operation, the operation of writing back the operation set value which is saved as the saving context in the second storing part 24 is executed.

Figure 9:
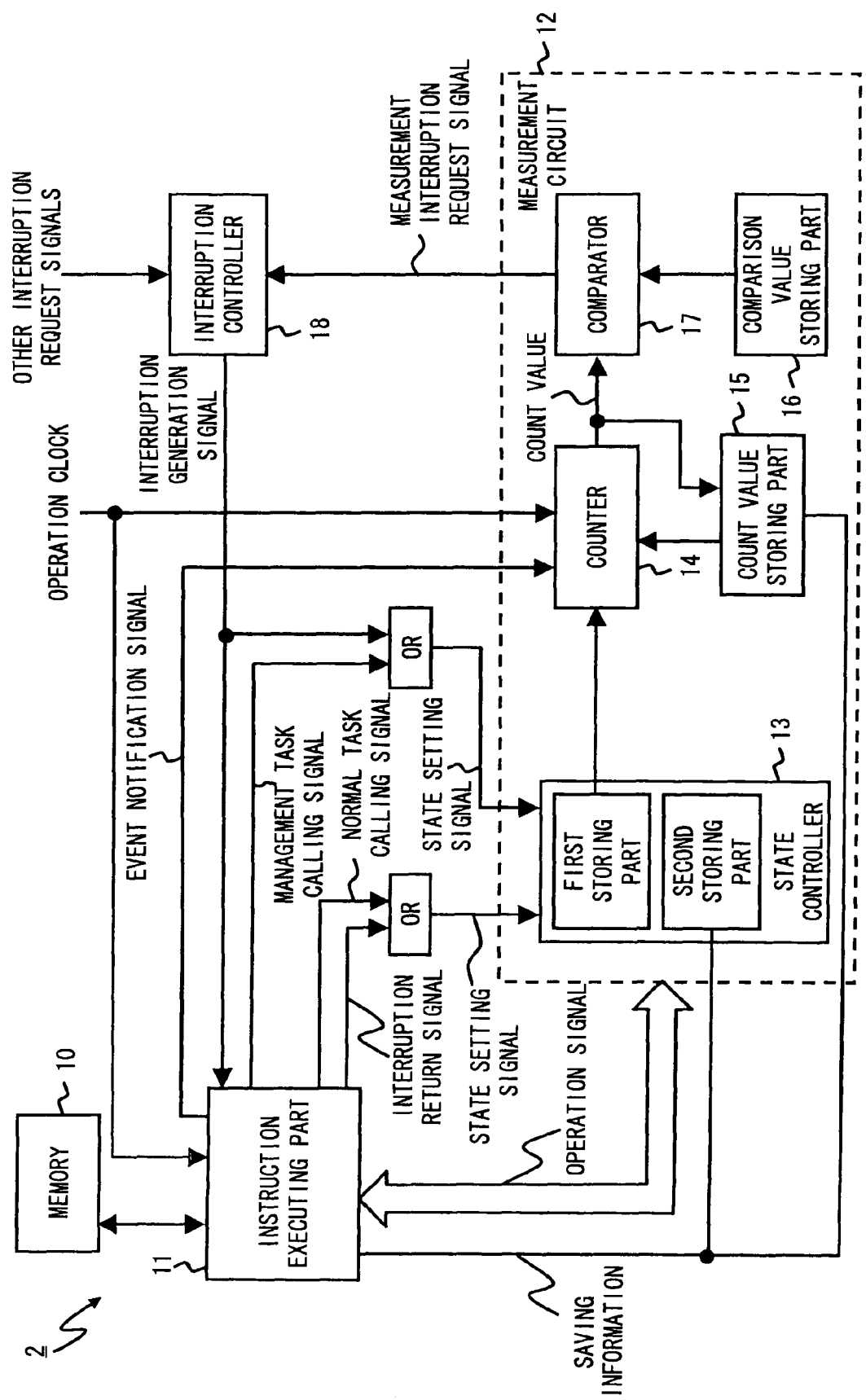
FIG. 9 is a block diagram of a data processing device according to a second exemplary embodiment.

FIG. 9 shows a block diagram of a data processing device 2 according to the second exemplary embodiment. As shown in FIG. 9, in the saving operation in the data processing device 2, the instruction executing part 11 reads out the operation set value stored in the second storing part 24 of the state controller 13 and the count value stored in the count value storing part 15 as the saving information. Then the instruction executing part 11 adds the information of the execution state of the normal task corresponding to the saving information to the saving information to store the information in the memory 10 as the saving context. Further, in the recovery operation, the instruction executing part 11 reads out the information saved as the saving context before the execution of the normal task. The instruction executing part 11 writes back the operation set value to the second storing part 24. The operation set value is included in the saved information which is saved using the operation signal. The instruction executing part 11 writes back the count value included in the saved information to the count value storing part 15.

Figure 10:
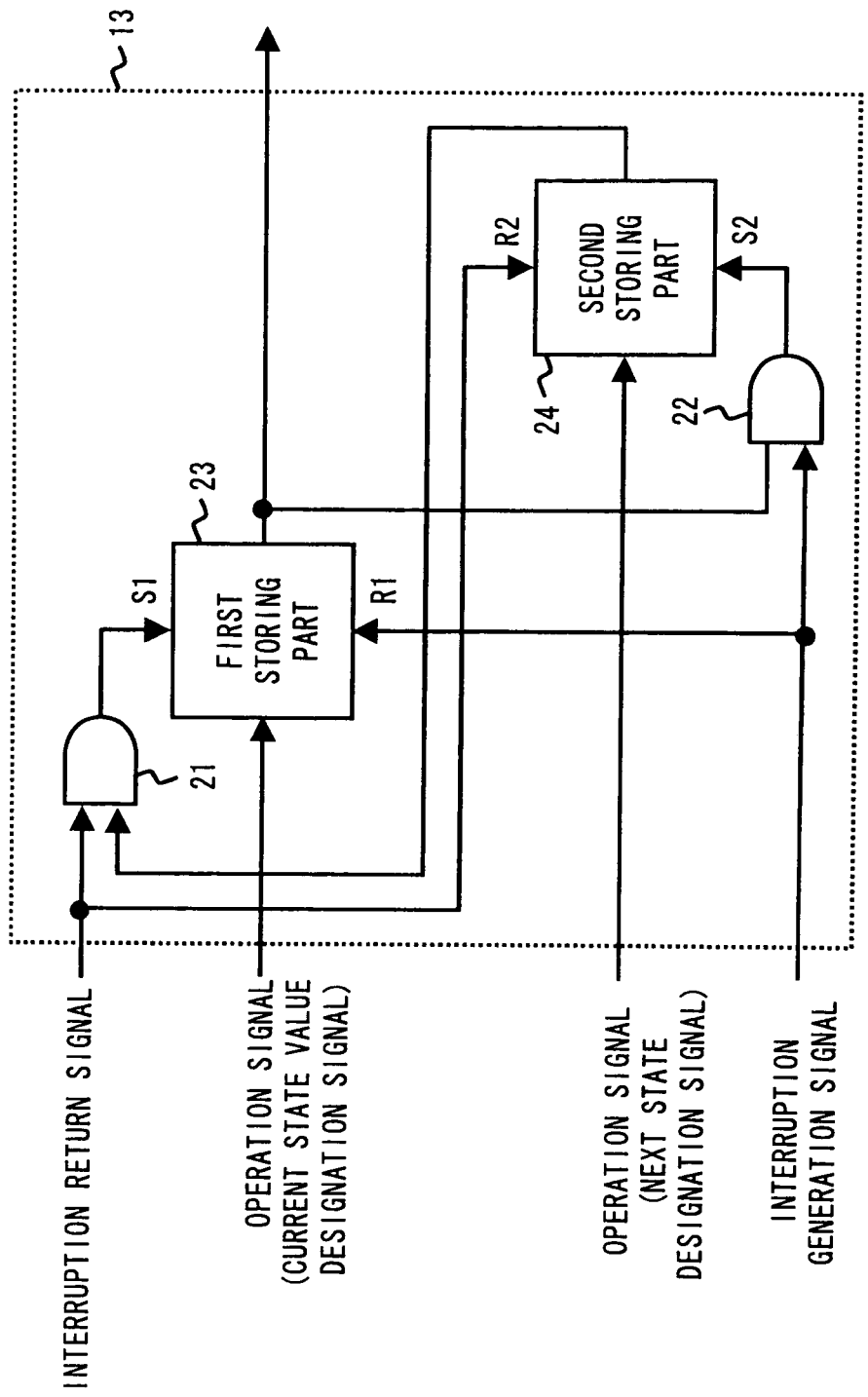
FIG. 10 is a block diagram of a state controller according to the second exemplary embodiment.

In the second exemplary embodiment, the operation signal output from the instruction executing part 11 includes a current state designation signal. The current state designation signal is input to the first storing part 23. FIG. 10 shows a block diagram of the state controller 13 according to the second exemplary embodiment. As shown in FIG. 10, in the state controller 13 according to the second exemplary embodiment, the current state designation signal is input to the first storing part 23. Upon receiving the current state designation signal, the first storing part 23 stores the value designated by the current state designation signal as the operation set value regardless of the values of the set signal S1 and the reset signal R1.

Figure 11:
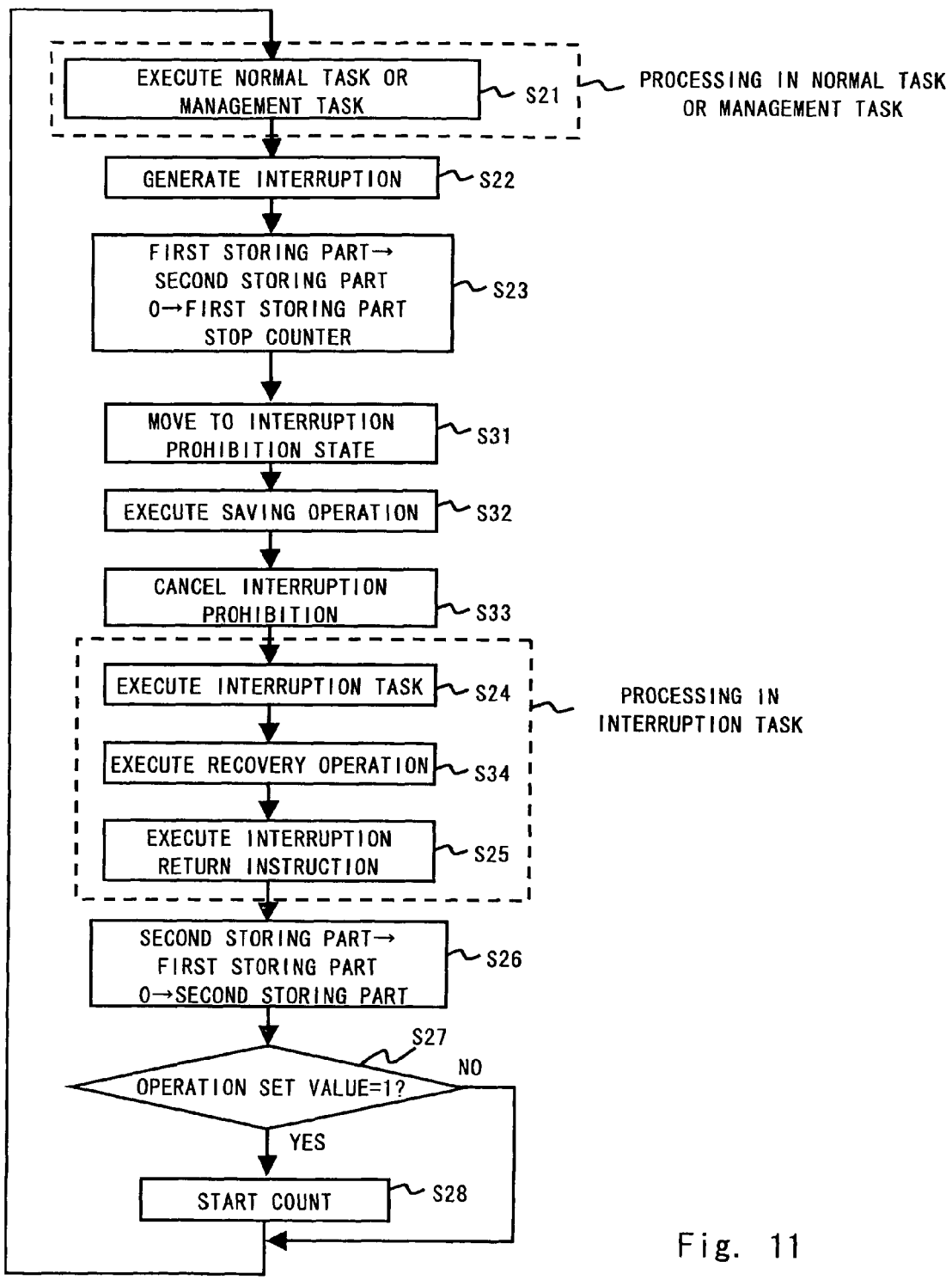
FIG. 11 is a flow chart showing the operation of the data processing device according to the second exemplary embodiment.

Now, FIG. 11 shows a flow chart showing the operation of the data processing device 2 according to the second exemplary embodiment. As shown in FIG. 11, the flow chart regarding the interruption task shown in FIG. 6 is changed to realize the saving operation and the recovery operation in the data processing device 2. More specifically, the saving operation and the recovery operation are added to the operation flow of the interruption task shown in FIG. 6.

As shown in FIG. 11, in the data processing device 2, the instruction executing part 11 is moved to the interruption prohibition state prohibiting the interruption from other interruption tasks (step S31) before the execution of the interruption task (after step S23). Then the instruction executing part 11 executes the saving operation in accordance with the interruption task (step S32). After that, the instruction executing part 11 cancels interruption prohibition (step S33). After the cancel of the interruption prohibition in step S33, the instruction executing part 11 executes the interruption task (step S24). The instruction executing part 11 executes the recovery operation before executing the interruption return instruction (step S34), and then the interruption return instruction is executed (step S25).

Figure 12:
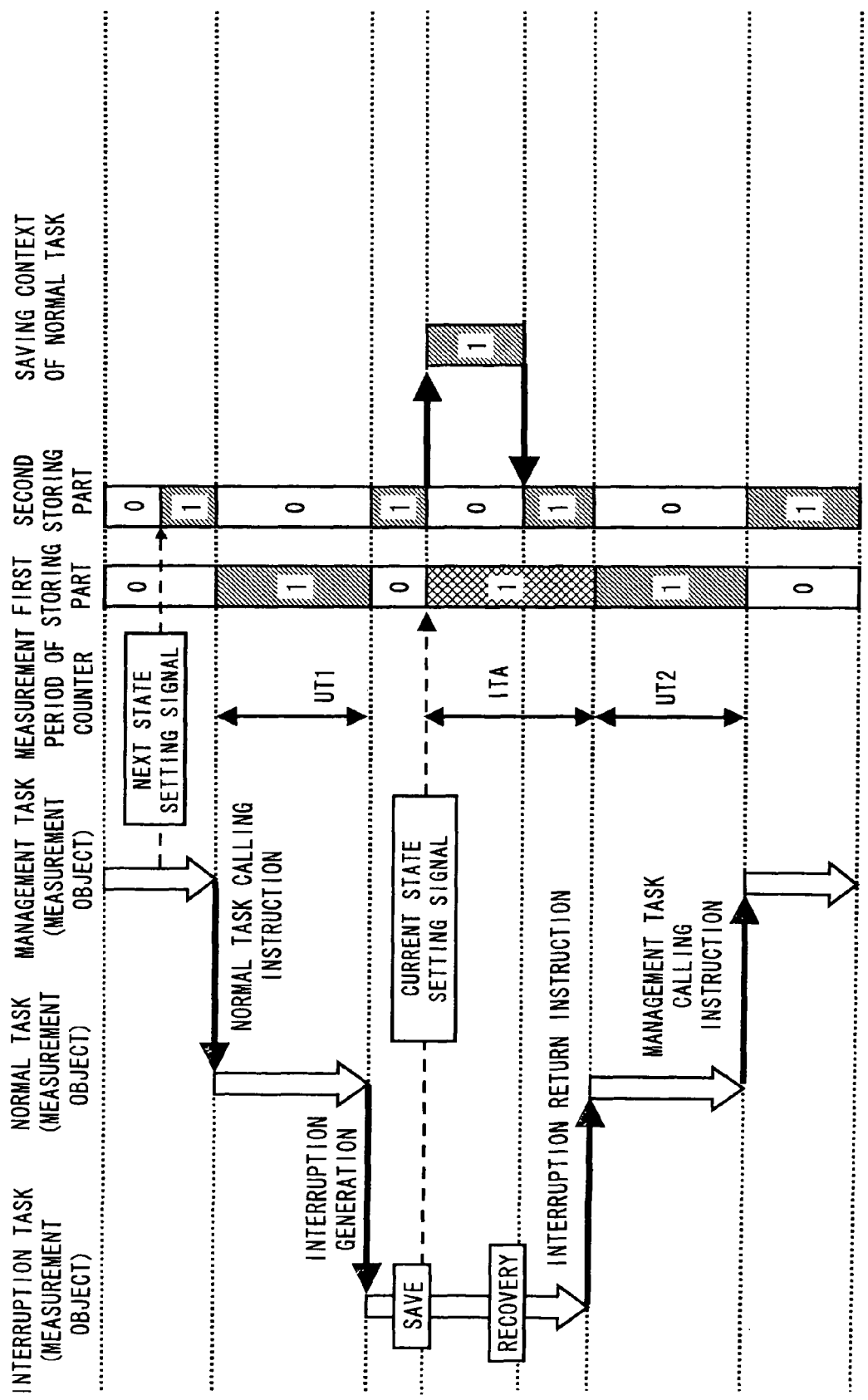
FIG. 12 is a sequence diagram showing the operation of the data processing device according to the second exemplary embodiment.

Now, FIG. 12 shows a sequence diagram showing the operation of the data processing device according to the second exemplary embodiment. In FIG. 12, the saving operation and the recovery operation of the second exemplary embodiment are applied to the sequence diagram in FIG. 8. The different part from that of the first exemplary embodiment will be described in the following description. As shown in FIG. 12, in the second exemplary embodiment, the instruction executing part 11 outputs the current state designation signal in accordance with the saving operation executed by the interruption task to set the operation set value indicating the first value in the first storing part 23. Then the counter 14 measures the execution time of the interruption task in synchronization with the change of the operation set value by the current state designation signal. The execution time of the interruption task which is measured here is called time ITA. Further, the operation set value of the normal task stored in the second storing part 24 is stored in the memory 10 as the saving context in accordance with the saving operation of the interruption task.

After that, when the recovery operation of the interruption task is executed before executing the interruption return instruction, the operation set value in accordance with the normal task is written back from the saving context to the second storing part 24. When the execution of the normal task is restarted, the operation set value of the second storing part 24 is moved to the first storing part 23 in synchronization with the restart of the operation of the normal task. Accordingly, the counter 14 restarts the operation in synchronization with the restart of the operation of the normal task to perform the measurement of the execution time of the normal task.

From the above description, according to the data processing device 2 of the second exemplary embodiment, the instruction executing part 11 rewrites the value stored in the first storing part 23 in accordance with the saving operation, whereby it is possible to measure the execution state even in the interruption task which is out of the object of the schedule performed in the management task. At this time, the period from when the saving operation is executed to when the operation set value is rewritten cannot be measured by the counter 14. Therefore, the accuracy of the measurement time in the second exemplary embodiment is inferior to that in the first exemplary embodiment. However, by setting the interruption prohibition period set in the saving operation in advance, the degrading of the accuracy can be prevented. For example, when the interruption prohibition period is set to 10 msec, 10 msec is added to the time measured by the counter 14, so as to prohibit degrading of the accuracy.

Further, in the data processing device 2 according to the second exemplary embodiment, the interruption task executes the saving operation and the recovery operation, and the instruction executing part 11 saves and recovers the stored value and the count value in accordance with the saving operation and the recovery operation. Accordingly, in the data processing device 2, it is possible to avoid the problem that the operation set value stored regarding the normal task stored in the second storing part 24 is erased by the interruption task.

Although the saving operation and the recovery operation are executed by the interruption task in the second exemplary embodiment, the execution of the saving operation and the recovery operation may be applied to the normal task as well. Accordingly, the saving operation and the recovery operation can also be executed even in the normal task.

Third Exemplary Embodiment

A third exemplary embodiment shows a case in which the interruption task performs multiple interruptions. In the third exemplary embodiment, the instruction executing part 11 executes an interruption task A which interrupts the normal task and an interruption task B which interrupts the interruption task A in addition to the management task and the normal task. Note that the interruption task A is the task of the measurement object and the interruption task B is the task out of the measurement object. As is the same as the second exemplary embodiment, the interruption tasks A and B also perform the saving operation and the recovery operation in the third exemplary embodiment.

The operation of the data processing device will be described with reference to FIG. 13, which is a sequence diagram showing the operation of the data processing device according to the third exemplary embodiment. In the example shown in FIG. 13, the operation regarding the management task is omitted for the sake of simplicity. In the normal task shown in FIG. 13, the operation is controlled by the management task, as is the same as the first exemplary embodiment. Since FIG. 13 is a variant example of the sequence diagram shown in FIG. 12, only a part different from that of FIG. 12 will be described below.

Figure 13:
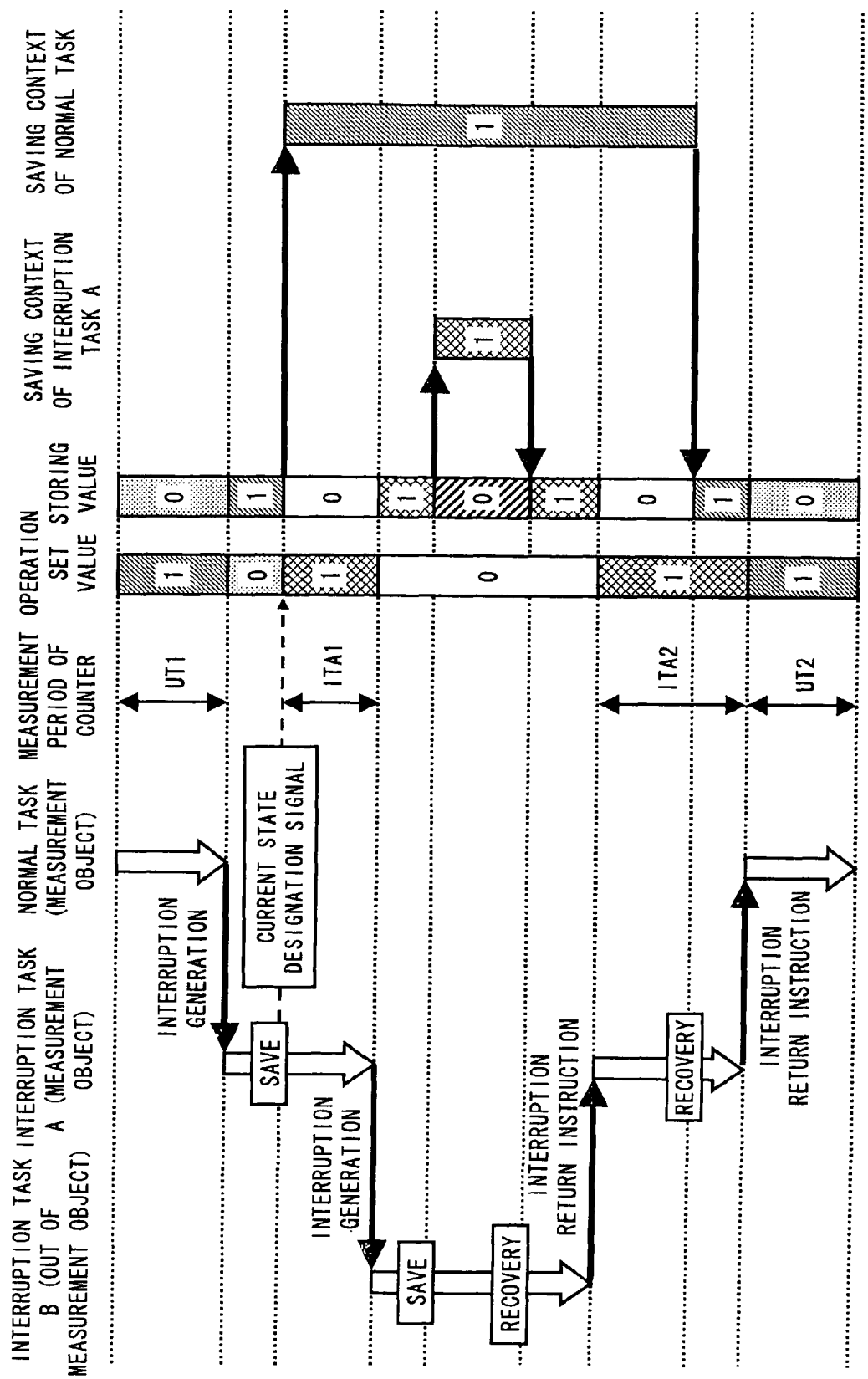
FIG. 13 is a sequence diagram showing the operation of the data processing device according to a third exemplary embodiment.

As shown in FIG. 13, the operation set value is 1 during a time at which the interruption task A is executed; therefore, the counter 14 measures the execution time of the interruption task A. When the interruption generation signal is generated during a time at which the interruption task A is executed, the task to be executed is switched from the interruption task A to the interruption task B in the instruction executing part 11. Along with this switch of the tasks, the operation set value stored in the first storing part 23 is moved to the second storing part 24 in the state controller 13. At this time, 0 is set in the first storing part 23. Accordingly, the counter 14 stops the measurement of the execution time of the task, and the count value storing part 15 stores the count value. Then, when the interruption task B is executed, the interruption task B executes the saving operation. In accordance with this saving operation, the instruction executing part 11 reads out the operation set value regarding the interruption task A stored in the second storing part 24 to store the operation set value in the memory 10 as the saving context.

Then, along with the advancement of the execution of the interruption task B, the interruption task B executes the recovery operation before completion of the task. The instruction executing part 11 reads out the saving context from the memory 10 in accordance with the execution of the recovery operation and writes back the operation set value corresponding to the saved interruption task A to the second storing part 24. This task A is saved with the operation signal. Then, the interruption task B executes the interruption return instruction. In accordance with the interruption return instruction, the instruction executing part 11 outputs the interruption return signal. In accordance with the interruption return instruction, the state controller 13 moves the operation set value regarding the interruption task A stored in the second storing part 24 to the first storing part 23. Accordingly, the first value is set in the first storing part 23, and the counter 14 restarts the count of the operation state of the interruption task A in accordance with the switch of the tasks.

From the above description, according to the data processing device of the third exemplary embodiment, even when the multiple interruption of the interruption task occurs, the task which is the measurement object and the task out of the measurement object can be divided without fail. In other words, even when the execution time of the interruption task is divided, it is possible to perform the measurement of the task of the measurement object without fail according to the data processing device of the third exemplary embodiment.

Note that the present invention is not limited to the above exemplary embodiments but can be changed as appropriate without departing from the spirit of the present invention. For example, the structure of the operation controller is not limited to the above exemplary embodiments but can be changed as appropriate depending on the data format of the stored values and the operation set values to be stored.

The first to third exemplary embodiments can be combined as desirable by one of ordinary skill in the art.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A data processing device, comprising:
an instruction executing part that executes one at a time of a normal task and a management task that schedules an execution order of the normal task, and the instruction executing part switching the normal task and the management task using a branch operation;
a counter that measures an execution state of the normal task being executed in the instruction executing part; and
a state controller that controls the counter in accordance with the normal task being executed in the instruction executing part,
wherein the instruction executing part determines whether a normal task, which is to be executed next of a plurality of normal tasks scheduled by the management task, comprises a measurement object, and outputs an operation signal notifying the state controller of a result of the determination,
wherein, when the state controller is notified by the operation signal that the normal task that is to be executed next comprises the measurement object, the state controller operates the counter in accordance with the branch operation by switching from the management task to the normal task,
wherein the state controller comprises:
a second storing part that stores an operation set value, based on the operation signal; and
a first storing part that stores the operation set value stored in the second storing part in accordance with the branch operation from the management task to the normal task,
wherein the counter starts or stops the operation, based on the operation set value stored in the first storing part,
wherein the instruction executing part executes an operation of:
changing a task to be executed from the management task to the normal task, based on an instruction of calling the normal task executed in the management task;
outputting a signal that calls the normal task in accordance with execution of the instruction of calling the normal task;
changing a task that is to be executed from the normal task to the management task, based on an instruction of calling the management task executed in the normal task; and
outputting a signal that calls the management task in accordance with execution of the instruction that calls the management task, and
wherein the state controller executes an operation of:
moving the operation set value from the second storing part to the first storing part in accordance with the signal that calls the normal task; and
moving the operation set value from the first storing part to the second storing part in accordance with the signal that calls the management task.

2. The data processing device according to claim 1, wherein the instruction executing part executes an interruption task interrupting the normal task or the management task, and
wherein the state controller causes the counter to stop measuring in accordance with the branch operation from the normal task to the interruption task, and to start measuring in accordance with the branch operation from the interruption task to the normal task when the normal task comprises the measurement object.

3. The data processing device according to claim 1, wherein the state controller moves the operation set value from the first storing part to the second storing part in accordance with the branch operation from the normal task to the management task.

4. The data processing device according to claim 1, wherein the operation set value comprises:
a first value indicating that the normal task that is to be executed next comprises the measurement object, when the normal task that is to be executed next of a plurality of normal tasks scheduled by the management task comprises the measurement object; and
a second value indicating that the normal task that is to be executed next is out of the measurement object, when the normal task that is to be executed next of a plurality of normal tasks scheduled by the management task is out of the measurement object, and
wherein the counter executes measuring during a period in which the first value is stored in the first storing part and stops measuring during a period in which the second value is stored in the first storing part.

5. A data processing device, comprising:
an instruction executing part that executes one at a time of a normal task and a management task that schedules an execution order of the normal task, and the instruction executing part switching the normal task and the management task using a branch operation;
a counter that measures an execution state of the normal task being executed in the instruction executing part; and
a state controller that controls the counter in accordance with the normal task being executed in the instruction executing part,
wherein the instruction executing part determines whether a normal task, which is to be executed next of a plurality of normal tasks scheduled by the management task, comprises a measurement object, and outputs an operation signal notifying the state controller of a result of the determination,
wherein, when the state controller is notified by the operation signal that the normal task that is to be executed next comprises the measurement object, the state controller operates the counter in accordance with the branch operation by switching from the management task to the normal task,
wherein the state controller comprises:
a second storing part that stores an operation set value, based on the operation signal; and
a first storing part that stores the operation set value stored in the second storing part in accordance with the branch operation from the management task to the normal task,
wherein the counter starts or stops the operation, based on the operation set value stored in the first storing part,
wherein the instruction executing part executes an operation of:
changing a task that is to be executed to an interruption destination task;
generating an interruption generation signal based on an interruption request instruction, the interruption request instruction being executed in accordance with an interruption generation signal input from outside of the instruction executing part;
changing a task that is to be executed to an interruption source task, based on an interruption return instruction executed in the interruption task; and outputting an interruption return signal in accordance with the execution of the interruption return instruction, and wherein the state controller executes an operation of:
movingtheoperationsetvaluefromthefirststoringpart to the second storing part in accordance with the interruption generation signal; and
moving the operation set value from the second storing part to the first storing part in accordance with the interruption return signal.

6. A data processing device, comprising:
an instruction executing part that executes one at a time of a normal task and a management task that schedules an execution order of the normal task, and the instruction executing part switching the normal task and the management task using a branch operation;
a counter that measures an execution state of the normal task being executed in the instruction executing part; and
a state controller that controls the counter in accordance with the normal task being executed in the instruction executing part,
wherein the instruction executing part determines whether a normal task, which is to be executed next of a plurality of normal tasks scheduled by the management task, comprises a measurement object, and outputs an operation signal notifying the state controller of a result of the determination,
wherein, when the state controller is notified by the operation signal that the normal task that is to be executed next comprises the measurement object, the state controller operates the counter in accordance with the branch operation by switching from the management task to the normal task,
wherein the state controller comprises:
a second storing part that stores an operation set value, based on the operation signal; and
a first storing part that stores the operation set value stored in the second storing part in accordance with the branch operation from the management task to the normal task,
wherein the counter starts or stops the operation, based on the operation set value stored in the first storing part,
wherein the data processing device includes:
a memory that stores a program for performing a task executed in the instruction executing part and intermediate information generated in accordance with execution of the task, and
wherein the instruction executing part executes an operation that includes:
reading out the operation set value of a branch source task of the interruption task from the second storing part, based on a saving operation executed in the interruption task;
storing the operation set value in the memory as a saving context;
reading out the saving context from the memory, based on a recovery operation executed in the interruption task; and
setting the operation set value in the saving context in the second storing part.

7. The data processing device according to claim 6, wherein the instruction executing part sets a value indicating that the interruption task being executed comprises the measurement object as the operation set value in accordance with the execution of the saving operation, when the interruption task comprises the measurement object.

8. The data processing device according to claim 1, wherein the data processing device includes a count value storing part that stores a count value output from the counter, and the counter reads out the count value stored in the count value storing part as a start value of the count in a start of the operation.

9. The data processing device according to claim 2, wherein the counter counts an operation clock supplied to the instruction executing part and measures an execution time of the normal task or the interruption task as an execution state of the normal task or the interruption task.

10. The data processing device according to claim 2, wherein the counter counts a number of events generated along with the execution of the normal task or the interruption task as an execution state of the normal task or the interruption task.

11. The data processing device according to claim 1, wherein the data processing device comprises:
a comparator that outputs a comparison match result of a count value output from the counter and a comparison value set in advance as the interruption request signal; and
an interruption controller that outputs an interruption generation signal designating a branch operation to the instruction executing part in accordance with an interruption request signal output from outside or from the comparator.

12. A method of controlling a data processing device, the data processing device comprising an instruction executing part that executes a normal task and a management task that schedules an execution order of the normal task, and the instruction executing part executes the normal task and the management task using a branch operation, a counter that measures an execution state of the normal task being executed in the instruction executing part, and a state controller that controls the counter in accordance with the normal task being executed in the instruction executing part, the method comprising:
determining whether a normal task that is to be executed next of a plurality of normal tasks scheduled by the management task comprises a measurement object or not; and
operating the counter in accordance with the branch operation from the management task to the normal task, when the normal task that is to be executed next is determined as comprising the measurement object,
wherein the instruction executing part executes an operation of:
changing a task that is to be executed from the management task to the normal task, based on an instruction of calling the normal task executed in the management task;
outputting a signal that calls the normal task in accordance with the execution of the instruction of calling the normal task;
changing a task that is to be executed from the normal task to the management task, based on an instruction that calls the management task executed in the normal task; and
outputting a signal that calls the management task in accordance with the execution of the instruction that calls the management task, and
wherein, when the normal task is the measurement object, the state controller executes an operation of:
starting an operation of the counter in accordance with a signal that calls the normal task; and
stopping an operation of the counter in accordance with a signal that calls the management task.

13. The method of controlling the data processing device according to claim 12, wherein the instruction executing part executes an interruption task that interrupts the normal task or the management task, and wherein the counter is stopped in accordance with the branch operation from the normal task to the interruption task and the counter is started in accordance with the branch operation from the interruption task to the normal task, when the normal task comprises the measurement object.

14. A method of controlling a data processing device, the data processing device comprising an instruction executing part that executes a normal task and a management task that schedules an execution order of the normal task, and the instruction executing part executes the normal task and the management task using a branch operation, a counter that measures an execution state of the normal task being executed in the instruction executing part, and a state controller that controls the counter in accordance with the normal task being executed in the instruction executing part, the method comprising:

determining whether a normal task that is to be executed next of a plurality of normal tasks scheduled by the management task comprises a measurement object; and operating the counter in accordance with the branch operation from the management task to the normal task, when the normal task that is to be executed next is determined as comprising the measurement object, wherein the instruction executing part executes an operation of:

changing a task that is to be executed to an interruption destination task;

generating an interruption generation signal, based on an interruption request instruction executed in accordance with an interruption generation signal input from outside of the instruction executing part;

changing a task that is to be executed to an interruption source task, based on an interruption return instruction executed in the interruption task; and outputting an interruption return signal in accordance with the execution of the interruption return instruction, and wherein, when the normal task comprises the measurement object, the state controller executes an operation of:

stopping an operation of the counter in accordance with the interruption generation signal; and starting an operation of the counter in accordance with the interruption return signal.

15. A method of controlling a data processing device, the data processing device comprising an instruction executing part that executes a normal task and a management task that schedules an execution order of the normal task, and the instruction executing part executes the normal task and the management task using a branch operation, a counter that measures an execution state of the normal task being executed in the instruction executing part, and a state controller that controls the counter in accordance with the normal task being executed in the instruction executing part, the method comprising:

determining whether a normal task that is to be executed next of a plurality of normal tasks scheduled by the management task comprises a measurement object; and operating the counter in accordance with the branch operation from the management task to the normal task, when the normal task that is to be executed next is determined as comprising the measurement object, wherein the instruction executing part executes an interruption task that interrupts the normal task or the management task, wherein the counter is stopped in accordance with the branch operation from the normal task to the interruption task and the counter is started in accordance with the branch operation from the interruption task to the normal task, when the normal task comprises the measurement object, wherein the data processing device includes a memory storing a program for performing a task executed in the instruction executing part and intermediate information generated in accordance with the execution of the task, and wherein the instruction executing part executes an operation including:

reading out the operation set value indicating whether a branch source task of the interruption task comprises the measurement object, based on a saving operation executed in the interruption task;

storing the operation set value in the memory as a saving context;

reading out the saving context from the memory, based on a recovery operation executed in the interruption task; and providing the operation set value in the saving context for the state controller.

16. The method of controlling the data processing device according to claim 13, wherein the counter counts an operation clock supplied to the instruction executing part, and measures an execution time of the normal task or the interruption task as an execution state of the normal task or the interruption task.

17. The method of controlling the data processing device according to claim 13, wherein the counter counts a number of events generated along with an execution of the normal task or the interruption task as an execution state of the normal task or the interruption task.

* * * * *